United States Patent [19]

Glomstad

[11] Patent Number: 5,722,719
[45] Date of Patent: Mar. 3, 1998

[54] CHILD'S SEAT FOR MOTOR VEHICLES

[75] Inventor: Geir O. Glomstad, Biri, Norway

[73] Assignee: HTS Hans Torgersen & Sonn as, Kroderen, Norway

[21] Appl. No.: 545,582

[22] PCT Filed: May 3, 1994

[86] PCT No.: PCT/NO94/00082

§ 371 Date: Jan. 19, 1996

§ 102(e) Date: Jan. 19, 1996

[87] PCT Pub. No.: WO94/25306

PCT Pub. Date: Nov. 10, 1994

[30] Foreign Application Priority Data

May 5, 1993 [NO] Norway ............. 931643

[51] Int. Cl.$^6$ ............................ B60N 2/42
[52] U.S. Cl. ............. 297/216.11; 297/216.16; 297/216.19
[58] Field of Search ............. 297/256.16, 216.16, 297/216.19, 216.13, 216.11

[56] References Cited

U.S. PATENT DOCUMENTS

| | | | |
|---|---|---|---|
| 2,328,234 | 7/1943 | Daniels et al. | 297/216.16 |
| 3,357,736 | 12/1967 | McCarthy | 297/216.19 X |
| 3,998,291 | 12/1976 | Davis | 297/216.19 X |
| 4,501,032 | 2/1985 | Heath et al. | 5/94 |
| 4,941,709 | 7/1990 | Moller | 297/311 X |
| 5,125,472 | 6/1992 | Hara | 297/219.19 X |
| 5,149,165 | 9/1992 | Woolley | 296/68.1 |
| 5,366,268 | 11/1994 | Miller et al. | 297/216.13 X |
| 5,366,269 | 11/1994 | Beauvais | 297/216.19 |
| 5,462,333 | 10/1995 | Beauvais | 297/216.11 |
| 5,551,751 | 9/1996 | Sedlack et al. | 297/216.19 X |

FOREIGN PATENT DOCUMENTS

| | | | |
|---|---|---|---|
| 1214385 | 4/1960 | France | 297/216.19 |
| 2 159 104 | 6/1973 | France . | |
| 2 596 338 | 3/1986 | France . | |
| 5296338 | 10/1987 | France | 297/216.11 |
| 2 645 477 | 4/1989 | France . | |
| 2706827 | 12/1994 | France | 297/216.11 |
| 2144702 | 9/1971 | Germany | 297/216.19 |
| 2016701 | 10/1971 | Germany | 297/216.16 |
| 2456028 | 8/1976 | Germany | 297/219.19 |
| 39 31 436 | 4/1991 | Germany . | |
| 450 634 | 7/1987 | Sweden . | |
| 2 104 783 | 3/1983 | United Kingdom . | |
| 2 202 433 | 9/1988 | United Kingdom . | |
| 2 216 405 | 10/1989 | United Kingdom . | |

Primary Examiner—Peter M. Cuomo
Assistant Examiner—David E. Allred
Attorney, Agent, or Firm—Jacobson, Price, Holman & Stern, PLLC

[57] ABSTRACT

A seat, especially a child's seat with a seat component adjustable on a frame for use in a motor vehicle where the frame member is divided into a lower section for securing to the motor vehicle, and an upper section for possible releasable securing of the seat component. The frame member's upper and lower sections have mutually facing convex contact surfaces for movement in relation to each other, and that between the convex contact surfaces there is provided a weight for movement between a first and second position. Furthermore the frame member's upper and lower sections are equipped with guides, preferably first and second guide pieces for movement between the first and the second position. The weight is releasably secured by a locking element in the first position and by a second locking element in the second position, and there are further provided buffers in order to check the seat's kinetic energy.

6 Claims, 3 Drawing Sheets

CHILD'S SEAT FOR MOTOR VEHICLES

The invention concerns a seat, especially a child's, seat with a seat component adjustable on a frame for use in a motor vehicle or other means of transport, where the seat component is movable between a first and a second position, where the seat component is releasably secured in the first position and where locking element is provided which will be released when a specific value for kinetic energy is reached, and thereby enable a movement of the seat component.

The invention is based on the problems involving injuries particularly to children in the age group 0–6 years in car accidents in recent years. Children are more liable to suffer whiplash injuries than adults, since a child's head weighs more in relation to the total bodily weight. In a sitting position the head/neck region is also very exposed to external injuries caused by foreign bodies resulting from a collision. Furthermore, a child's internal organs are considerably more sensitive to pressure/impact than in the case of an adult.

There are already known seats for transporting children in motor vehicles, including a seat component which is permanently or adjustably fastened to a back support. There are further known child's seats for motor vehicles which are adjustable in the longitudinal direction and only intended for altering the sitting position. In the event of a collision there will be no change in the position of the seats.

FR 2 596 338 relates to a child's seat having only a longitudinal (back to front) movement, and which does not turn the child with its back to the collision point. The child's seat is not provided with a weight which contributes in guiding the rotation of the seat, and means for locking the seat after rotation. Furthermore, the seat can also be locked to prevent a rotation in a collision.

Reference is also made to UK 2 202 433 amongst others which describes such child's seats for motor vehicles being adjustable in the longitudinal direction and only for altering the sitting position. Further reference can be made to DE 39 31 436 which also describes a child's seat for a motor vehicle also having an adjustable head support.

In ordinary, child's seats for motor vehicles the child's body will be thrown towards the collision point and exposed to glass splinters or other loose foreign bodies which are flying through the air.

With regard to the approval of to-day's child's seats, these are based on collision tests either from directly in front or from directly behind. However, the injury, picture can be fundamentally altered by a change of only a few deuces in the collision angle. Moreover, from the statistical point of view, a collision picture according to the pattern of the collision tests is seldom seen in relation to the total number of variations in accident patterns. Thus, one of the requirements for the present invention is that it should function equally well regardless of where the collision point occurs.

A problem has arisen recently in connection with backward facing child's seats for motor vehicles mounted on the passenger side in private cars with airbags. Until now the positioning of backward facing child's seats for cars in the front seat has been considered to be the safest option. Due to the airbag this is no longer possible.

Thus, an object of the present invention is to provide a seat, especially a child's seat for motor vehicles which can absorb and neutralize much of the dangerous load to which a person is subjected by his body's own inertia, particularly in the head/neck region during a collision.

Thus, the general object of the invention is to provide a seat which can be mounted facing both forwards and backwards and which alters the body's position during a collision, to a position which is more favourable with regard to reducing the risk of whiplash injuries and the pressure on the internal organs, while also pulling the child's head/neck region away from the area which is particularly dangerous in a collision, e.g. a sitting position on a level with the windows.

By means of the invention there is achieved a design of a seat Which enables the person to remain secure in the event of a collision, the seat being rotatably mounted in a frame member in such a manner that the person is turned/swivelled with his back to the collision point. Thus, the device according to the invention provides the possibility of a new method of protection which increases the safety especially for children transported in a car.

The design according to the invention also reduces the pressure on vital internal organs in contrast to ordinary seats, where the person or child is thrown against the seatbelt in a collision.

With a child's seat according to the invention a design is achieved which pulls the child down from its normal sitting height and protects its head and internal organs from foreign bodies and loose objects resulting from the collision. The device thereby reduces the likelihood of whiplash injuries, since the seat alters the position of the body and the head in relation to the collision point.

A further requirement for the child's seat for motor vehicles is that it fulfills the requirements/regulations from the authorities, insurance companies, etc. which are in force at the time in question.

The invention will now be described in more detail by means of embodiments which are illustrated by means of the drawings.

Figure 1:
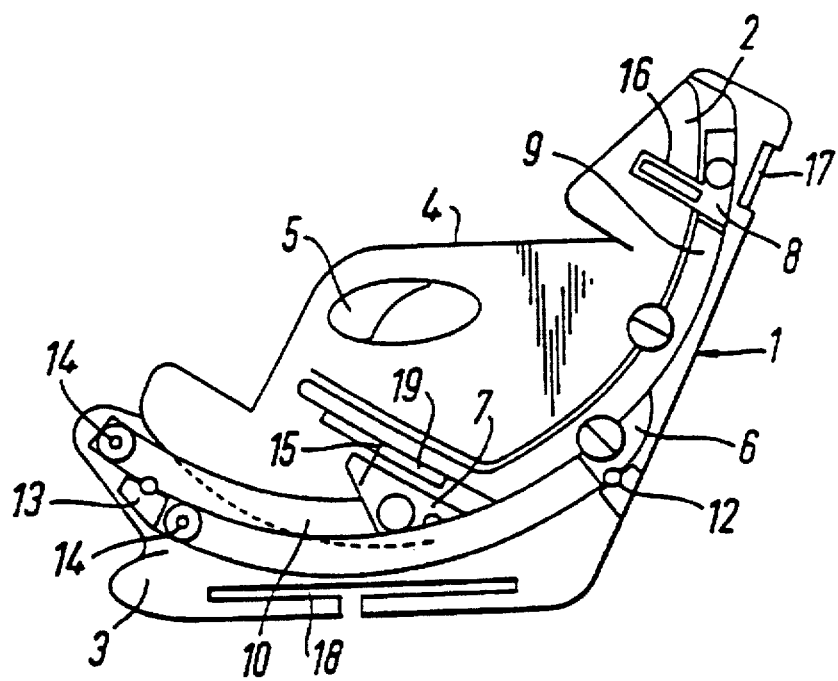
FIG. 1 illustrates a side view of a design according to the invention in a first position.

In the drawings a child's seat is generally indicated by 1, while the frame member's upper and lower sections are indicated by 2 and 3 respectively. In the frame member's upper section 2 there is provided a seat component 4 with a handle 5 for scat adjustment and possible disconnection from the upper section 2. Between the upper section 2 and lower section 3 there are further provided mutually facing convex contact surfaces in the form of sliding tracks 10, 15, 16 for movement in relation to each other. The seat is attached in the adjusting frame 9 between guides, preferably a first 7 and a second 8 guide piece, which by means of the sliding track 10 ensure that the frame member's upper section 2 together with the seat component 4 can be moved in relation to the frame member's lower section 3. In order that the seat component 4 should simultaneously be able to achieve a lateral movement there are provided sliding tracks 15 and 16 on the guide pieces 7 and 8 respectively. The lower sliding track 15 comprises a rotation plate 19 rotatably mounted on the guide piece 7. The upper sliding track 16 is composed of a semicircular sliding track mounted on the guide piece 8.

The movement of the seat component 4 is determined both by the weight of the child and the weight 6, which is mounted in an adjusting frame 9 in the back of the seat, and which will move against any external influence which attempts to alter the seat's direction of movement. In order to secure the weight 6 there is provided a spring loaded securing device 12 with a locking arrangement which prevents the seat component 4 together with the upper section 2 from being uncontrollably rotated. The securing device 12 ensures that the seat component 4 and The upper section 2 are kept in position until a collision or breaking of sufficient force occurs, thereupon releasing the weight 6 which ensures that the seat component 4 and the upper section 2 are moved by means of the sliding Tracks 10, 15, 16 to the most favourable position possible in relation to the collision point. At one end of the guide pieces sliding tracks 10, 15, 16 there are provided rotary brakes or buffers 14 to moderate the kinetic energy of the seat component 4. Anchorage points 17, 18 are provided to secure the seat assembly. 1 to the car's 3-point belt.

Figure 2:
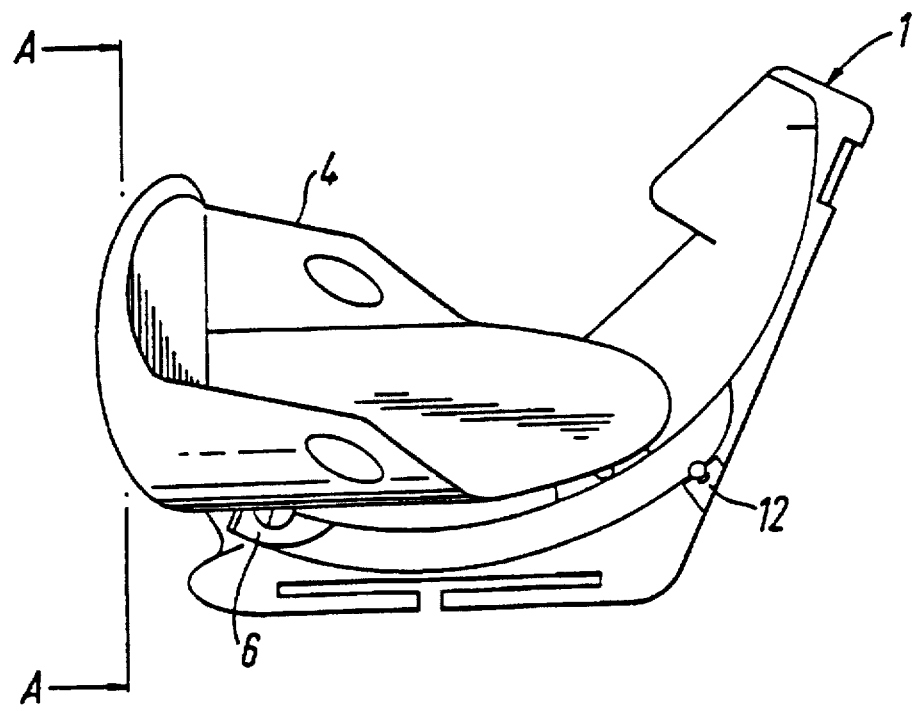
FIG. 2 is a side view of the invention according to FIG. 1 in a second position.
Figure 3:
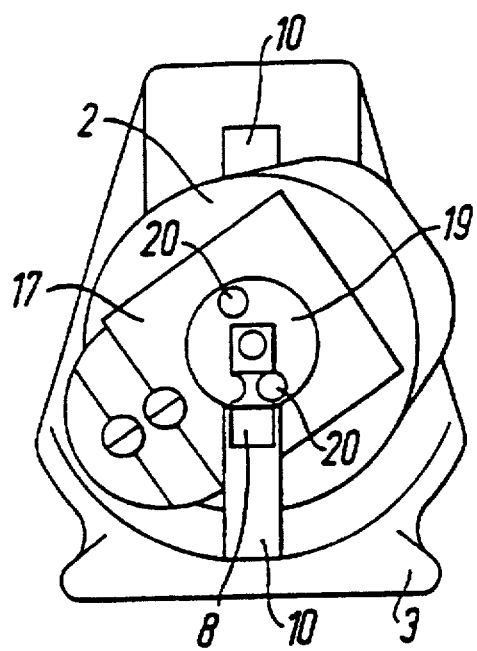
FIG. 3 is a front view oft he invention along line A—A according to FIG. 2.

FIGS. 1-3 illustrate a design with the sliding tracks 10, 15, 16 for both longitudinal and lateral movement between a first position (FIG. 1) and a second position (FIGS. 2 and 3). FIGS. 2 and 3 are otherwise only intended to be an example of a possible rotation in the event of a collision. As previously mentioned, this design will rotate the seat component 4 to the most favourable position possible in relation to the collision point.

Figure 5:
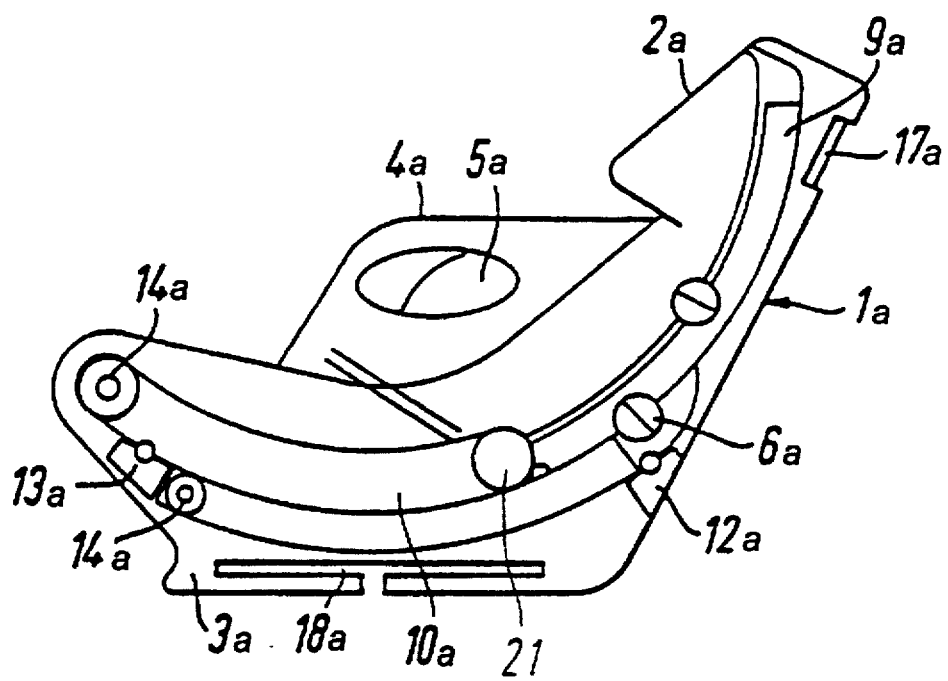
FIG. 5 is a side view of a second design according to the invention in a first position with the reference numerals and parts in common with FIG. 1–4 including the suffix "a".
Figure 6:
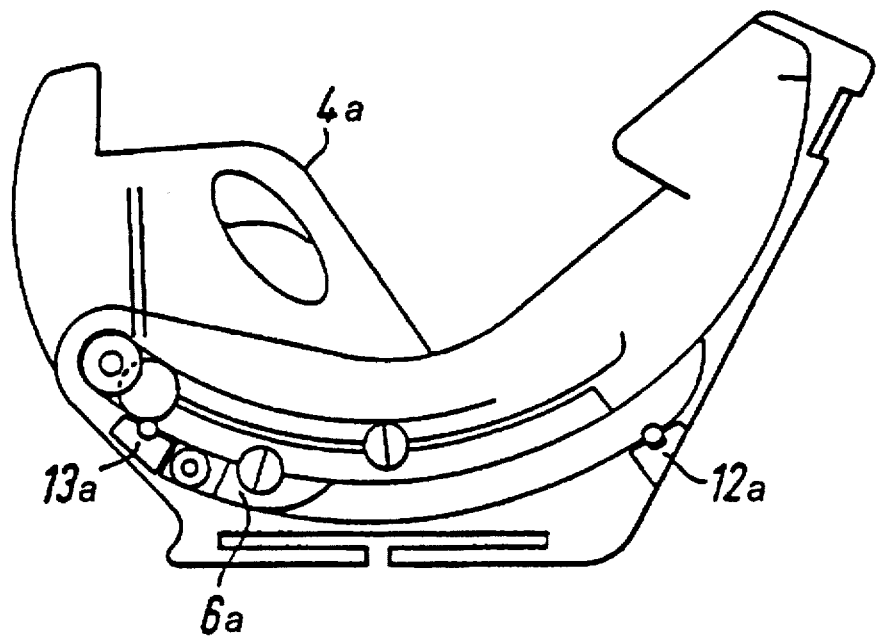
FIG. 6 is a side view of the invention according to FIG. 5 in a second position.

FIGS. 5 and 6 illustrate a second design with the sliding track 10a with a guide wheel 21 for a movement only between a first position and a second position.

This design is intended only for movement in the longitudinal direction (back front).

Figure 4:
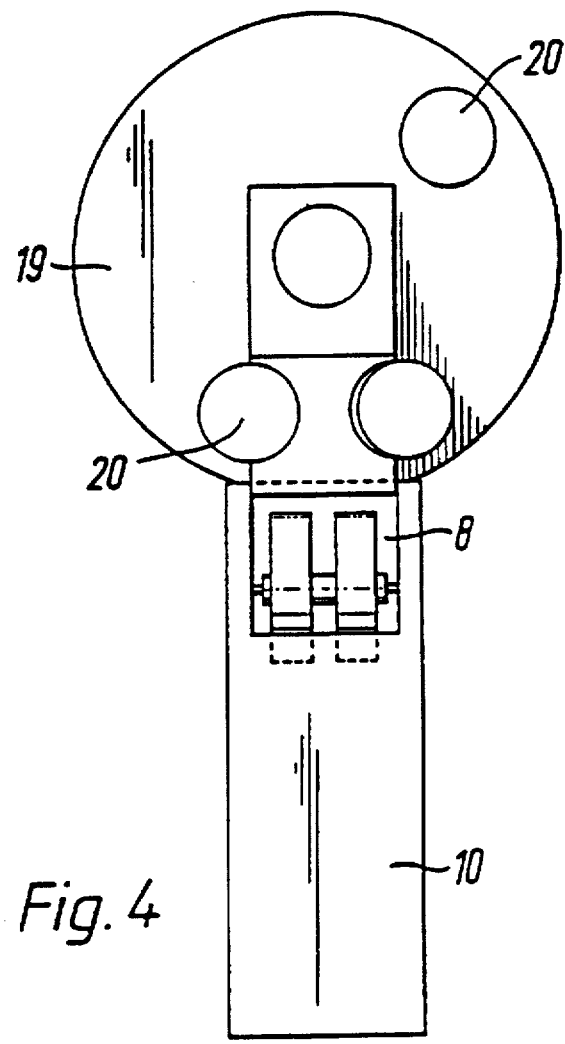
FIG. 4 illustrates a partial cross section of the invention according to FIG. 3.

As illustrated in FIG. 4 the guide pieces 7, 8 can move in the sliding track 10, e.g. by means of built-in wheels or ball bearings.

Embodiments in which the seat is mounted facing forwards will now be described, during a collision from directly in front and from 45 degrees to the right in the direction of travel respectively:

EXAMPLE 1

During a collision a force is created which is sufficiently strong to release the weight 6a and the frame member's upper section 2a together with the seat component 4a in the first position (FIG. 5) from the securing device 12a and set them in motion. The seat component 4a will then move down and The bottom of the seat will swing up and forward, while the upper part of the seat will be pulled down in the frame. The movement is stopped by the buffers 14a, and the guide wheel 21 which will be locked by a spring loaded locking device 13a in the second position (FIG. 6).

EXAMPLE 2

Since the securing device 12 releases the frame's upper part 2 it will be moved forward in the same way as above while at the same time moving to the right towards the collision point. This lateral movement is achieved by means of the rotation plate 19 and a rotation of the frame member's upper part 2 to the side in the guide piece's 8 sliding track 16. The rotation around The rotation plate 19 in the lower guide piece 7 stops against its rotary brake or buffer 20 and is then locked in the guide's seat lock. The seat component 4 will then assume a position in which it is pulled down in the frame with its back to the collision point on the right side.

A deflection of the weight 6 to one of the sides, e.g. in the event of a pure side collision, will also result in a movement forward, but not necessarily vice versa.

In the illustrated embodiments there are only shown possible designs of the invention, but it should be obvious that the relative movement between the frame members can include further designs, e.g. the principle in the form of two hemispheres movable in relation to each other or where the actual mounting is arranged in the centre of rotation for the movement of the seat. Furthermore the invention can also be employed for the transport of delicate loads, transport of infants/children in a recumbent position in bags with a safety, net, in lifeboats which are dropped from oil installations and for use in high-speed passenger boats. Thus many modifications are possible within the scope of the invention, as defined by the appended claims.

I claim:

1. A child's seat for use in a vehicle, said child's seat comprising:

a frame member, a seat component longitudinally movable between a first position and a second position on said frame member, said seat component being releasably secured in the first position and released from the first position when a specific value for kinetic energy is reached to enable a movement of the seat component to and retention at the second position, said frame member being divided into a lower section for mounting in the vehicle and an upper section supporting the seat component, the upper section and the lower section having mutually facing convex contact surfaces and including a guide track for movement of the upper and lower sections in relation to each other, a weight located between the convex contact surfaces for movement between the first and the second position when the specific value for kinetic energy is reached, first and second guide pieces moving in the guide track between the upper section and the lower section of the frame member for movement of the seat component between the first and the second position, the weight being releasably secured in the first position and being releasably secured in the second position upon traveling to the second position, and buffers located in the guide track to check the kinetic energy of the seat component when the seat component is released from the first position and moved to retention in the second position.

2. A child's seat according to claim 1,
wherein the weight is a mass which is sufficiently large to move the seat component to the second position when the weight is released from the first position.

3. A child's seat according to claim 1,
wherein the weight is provided on the upper section of the frame member.

4. A child's seat according to claim 1,
wherein a first spring-loaded locking element holds the seat component in the first position and a second spring-loaded locking element holds the seat component in the second position.

5. A child's seat according to claim 1,
wherein the seat component is adjustable in relation to the upper section of the frame member.

6. A child's seat according to claim 1, wherein said seat component is also rotatable upon moving from the first position to the second position.

* * * * *